March 24, 1936.  A. HUGUENIN  2,034,816
WHEEL FOR VEHICLES RUNNING ON RAILS
Filed Dec. 20, 1934
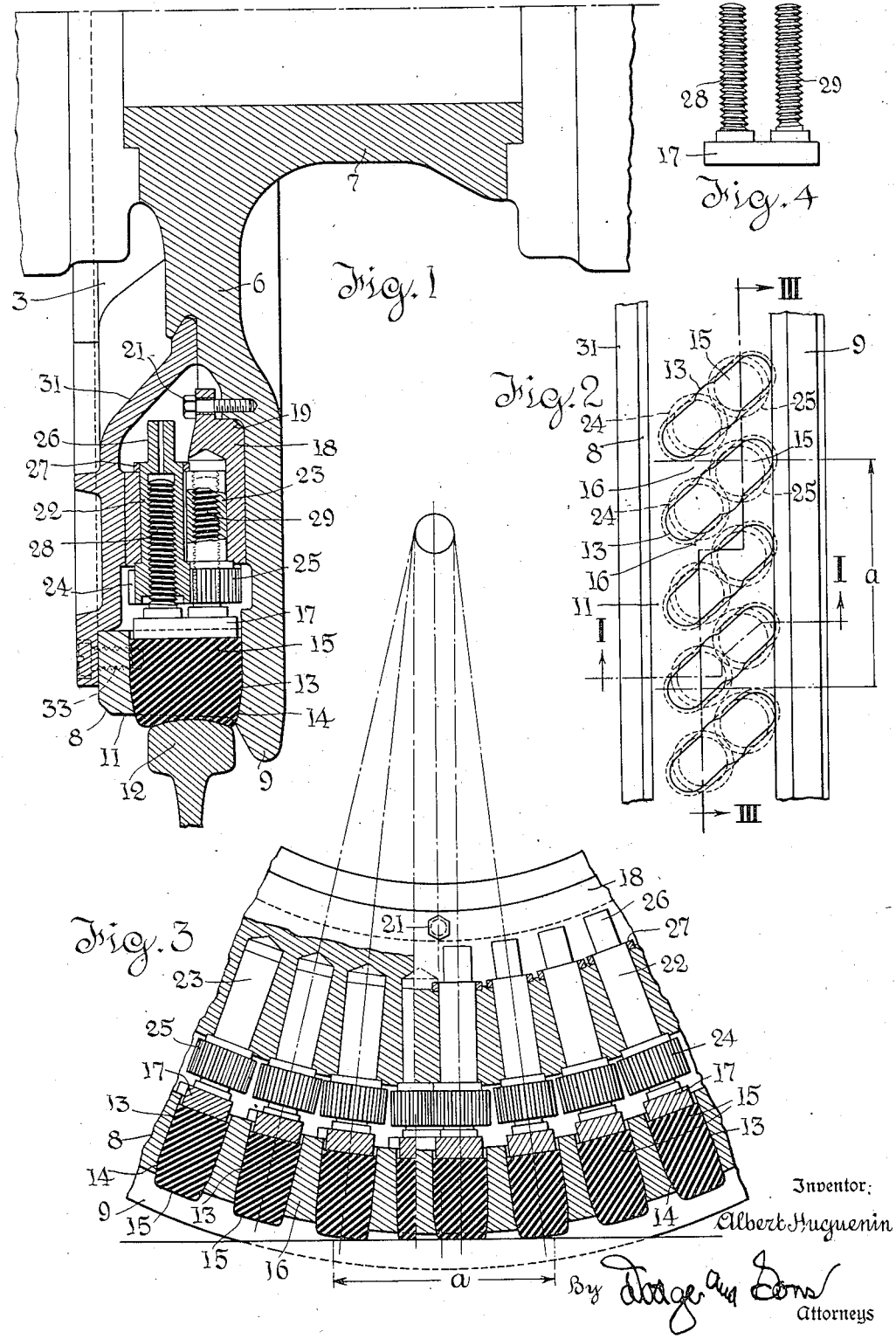
Inventor:
Albert Huguenin Patented Mar. 24, 1936

2,034,816

UNITED STATES PATENT OFFICE 2,034,816

WHEEL FOR VEHICLES RUNNING ON RAILS

Albert Huguenin, Zurich, Switzerland

Application December 20, 1934, Serial No. 758,488
In Switzerland December 26, 1933

15 Claims. (Cl. 295—31)

This invention relates to wheels for railroad cars and other vehicles running on rails. The invention is characterized by the use of elastic inserts which are mounted in the tread of the wheel and which project beyond the metal tread and thus form the rolling surface of the wheel. The inserts may, and preferably do, take the form of solid rubber blocks, and such blocks are so arranged as to produce a continuous rolling contact with the rail.

Wheels of this type, like rubber treaded wheels in general, have the advantage that the adhesion between the wheel and rail is far higher than that secured with wheels having hard metal treads. As a result the traction for a given wheel load is greatly increased. This makes it possible to secure adequate traction without excessive dead weight.

In the railroad industry the demand for high tractive power has led to the carrying of so much excess weight that economy of operation is seriously impaired and the railroads are having difficulty in competing with traffic over the ordinary roads. By the use of wheels of the type disclosed in the present application, a number of disadvantages inherent in metal tired wheels are avoided. The transmission of shock through the wheel to the car is greatly diminished with the result that the spring suspensions may be materially simplified. In present railway practice for passenger cars, it is customary to use as many as three spring devices, and even with these it is necessary to use a very heavily built car to insure comfortable riding qualities.

Wheels with metal treads damage the rolling stock, because of the undiminished shocks transmitted thereto, and injure the permanent way particularly at the rail joints. Furthermore, much objectionable noise is created by the direct interaction of the metal wheel and steel rail. Consequently, the substitution of wheels of the type herein described and claimed offers substantial advantages.

The use of elastic treads in railroad wheels, as heretofore proposed, is attended with serious risk of derailment of the train in the event that the elastic tread is damaged or destroyed. An important characteristic of the present invention is that the metal rim of the wheel, in which the elastic inserts are mounted, is so formed as to offer a smooth and continuous rolling surface contact with the rail in the absence of the inserts. Consequently, the destruction or impairment of the inserts will not cause derailment.

This result is secured by giving to the inserts an elongated form and setting them in spaced confining pockets in the wheel rim, so disposed that the inserts extend the entire width of contact with the rail and in a spiral direction, i. e., a direction oblique to the longitudinal axis of the rail. The length of the inserts in this oblique or spiral direction and their spacings are such that the inserts overlap and thus offer a continuous rolling surface in contact with the rail. Similarly the intervals between the pockets in the rim, which take the form of metal bridges between the pockets, also overlap, and in the absence of the inserts will offer a continuous metal rolling surface in contact with the rail. The overlapping relation of the inserts is such that at least one, and preferably a number, of the inserts are in supporting contact with the rail simultaneously, thus insuring smooth rolling contact and avoiding undesirable vibration and shock.

A further feature of the invention is the mounting of the inserts in such a way that they are readily adjustable to compensate for wear. The construction is such that the rails and the metal portions of the wheel are subjected to little or no wear, the wear being concentrated upon the elastic inserts which are readily replaceable without undue expense. In this way a substantial economy in maintenance is secured, together with all the advantages inherent in the use of the elastic tread.

An illustrative embodiment of the invention will now be described in connection with the accompanying drawing, in which,—

Fig. 1 is a sectional view of a portion of a wheel constructed according to the invention. The section is taken on two planes offset relatively one to the other, as indicated by the line 1—1 of Fig. 2, the purpose being to show the construction of the adjusting means, portions of which are in different planes.

Fig. 2 is a development of a portion of the tread of the wheel, showing the location and arrangement of the inserts.

Fig. 3 is a section perpendicular to the axis of the wheel, the section being taken on two planes, as indicated by the line 3—3 in Fig. 2.

Fig. 4 is a detail view of a portion of the means for adjusting an insert.

The metallic wheel body comprises a web 6 formed integrally with the hub 7, and an overhanging rim 8 with flange 9. The rim 8 has a tread portion 11, and the profile of the tread portion 11 and flange 9 conforms generally to present practice, so that in the absence of the inserts hereinafter described, the tread and flange will coact with the rail head 12 in the conventional manner, offering the same degree of safety against derailment as is now secured.

Extending through the overhanging rim portion 8 are a series of apertures or pockets 13. Generally stated, these apertures extend in a direction radial with respect to the wheel and they are tapered or contracted toward the periphery of the wheel, such tapering being indicated at 14 in Figs. 1 and 3. The purpose of this is to resist outward motion of the inserts 15 which are put in place from the inner side of the rim 8. These inserts are molded to a form which will closely fit the pockets and thus resist the outward escape of the inserts from the pockets.

The general form of the inserts 15 and their arrangement in the rim are clearly indicated in Fig. 2, in which the exposed ends of the inserts are visible. From this figure it is apparent that each insert is long and relatively narrow, with its major axis extending at approximately 45° to the center line of the contacting rail. Each insert is of such length as to extend beyond both sides of the rail head 12 (see Fig. 1) and each overlaps the two adjacent inserts, thus affording a continuous rolling surface. Since the inserts are resilient or deformable, the actual zone of contact with the rail head 12, is of substantial extent when measured in the direction of the circumference of the wheel, and a typical length of such zone of contact is indicated by the dimension lines $a$ on Figs. 2 and 3.

It will be understood from the showing in the drawing and what has already been said, that the inserts project beyond the periphery of the tread 11 and normally form the rolling contact surface between the wheel and the rail. It should be observed, however, that the pockets 13 are separated by metallic bridges 16, which, like the inserts, are oblique to the center line of the rail, and are in overlapping relation, so that in the absence of the inserts the metallic tread 11 would offer continuous rolling contact with the rail head 12, and this feature is considered to be a point of major importance.

It may be observed at this point that with a wheel constructed as above described, the permissible wheel loads greatly exceed the permissible loading of a pneumatic tired wheel, wheel loads up to 5000 kg. being permissible. A contributing factor to the high permissible loading above suggested, is the close lateral confinement of the inserts.

Since the inserts 15 are subject to wear, it is desirable to provide means for adjusting them radially. To accomplish this purpose each insert 15 is supported and forced radially outward by an adjustable plunger 17, the various plungers 17 being adjustably mounted on a ring 18 which is removably supported in the wheel body. The ring 18 is centered by a shoulder 19, and is fastened in place by machine screws, one of which appears at 21 (Fig. 1). Swiveled in approximately radial parallel bearings in the member 18 are pairs of sleeves 22 and 23 which are connected to turn simultaneously in reverse directions by the gear teeth 24 and 25, which mesh, as shown. Each sleeve 22 is provided with a squared projecting end 26 to receive a wrench, and is held against withdrawal from its bearing by means of the flange-forming rim 27, fixed thereon. Each adjustable plunger 17 carries two spaced parallel stems 28 and 29 which are reversely threaded, and which engage internal threads in corresponding sleeves 22 and 23, respectively. In the drawing the stem 28 is indicated as having left hand threads, and the stem 29 as having right hand threads, but the direction of the threads is immaterial so long as they are opposite. The opposed threading is necessary because the gear teeth 24 and 25 constrain the sleeves of a pair to rotate simultaneously in opposite directions.

Since the sleeves 22 and 23 are threaded on the stems 28 and 29, fixed on the plungers 17, the retention of one sleeve in the ring 18 is effective to retain both, so that the flange 27 serves to retain both sleeves in the ring.

The ring 18 and the sleeves just described, are housed within the overhanging rim 8 of the wheel, and are enclosed and protected by a cover structure 31 which is made in a plurality of sections, six or eight being a suitable number. Each section is retained by inserting its inner periphery under the overhanging flange 32 and by connecting its outer periphery to the rim 8 by means such as the machine screw 33, shown in Fig. 1.

To adjust the inserts 15 one or more of the cover plates 31 may be removed. By applying a wrench to the squared head 26 the two sleeves may be turned simultaneously to adjust the corresponding insert 15. The various inserts are adjusted individually. In this way the inserts may all be set to project uniformly beyond the metal tread 11, after which the cover plates 31 may be replaced.

If it is necessary to renew an insert or inserts, the plungers 17 are all retracted and screws 21 are removed, whereupon the ring 18 with the mechanism sustained thereby, may be withdrawn as a unit. When this has been done worn inserts may be removed and replaced with new inserts, after which the ring 18 is replaced and fastened in position. After the plungers 17 have been suitably adjusted the cover plates 31 are restored and the wheel is again in condition for use.

While the straight elongated form for the insert, indicated in Fig. 2, is the simplest and is preferred, it will be obvious to persons skilled in the art that other forms offering the benefit of overlapping relation with intervening overlapping bridges, can be devised, and such modified arrangements are deemed to be within the scope of the invention. Furthermore, while blocks of solid rubber are preferred as inserts, the use of synthetic rubber, or bodies built up of rubber, or synthetic rubber with suitable reinforcing material, may be used, without departing from the invention. The invention in its broader aspects is concerned primarily with the form and location of the inserts and the manner in which they are adjusted, rather than with the particular material which may be selected for the inserts, so that latitude in the selection of elastic material for the inserts is contemplated.

What is claimed is,—

1. A wheel for rail vehicles comprising in combination, a metallic wheel body having a tread and a flange, adapted to cooperate with the head of a rail, said tread comprising a circumferential series of elongated oblique overlapping bridges, with intervening elongated overlapping oblique slots, said bridges being so dimensioned and arranged as to be capable of supporting the wheel on and entering into smooth rolling contact with a rail; and elastic inserts mounted in said slots and projecting beyond said tread to form the surface normally in rolling contact with the rail.

2. A wheel for rail vehicles comprising in combination, a metallic wheel body having a tread and a flange, adapted to cooperate with the head of a rail, said tread comprising a circumferential series of elongated oblique overlapping bridges, with intervening elongated overlapping oblique slots, said bridges being so dimensioned and arranged as to be capable of supporting the wheel on and entering into smooth rolling contact with a rail; elastic inserts mounted in said slots and projecting beyond said tread to form the surface normally in rolling contact with the rail; and means for adjusting said inserts in radial directions.

3. A wheel for rail vehicles comprising in combination, a metallic wheel body having a tread and a flange, adapted to cooperate with the head of a rail, said tread comprising a circumferential series of elongated oblique overlapping bridges, with intervening elongated overlapping oblique slots, said bridges being so dimensioned and arranged as to be capable of supporting the wheel on and entering into smooth rolling contact with a rail; elastic inserts mounted in said slots and projecting beyond said tread to form the surface normally in rolling contact with the rail; and independent means for adjusting each of said inserts in a radial direction.

4. A wheel for rail vehicles comprising in combination, a metallic wheel body having a tread and a flange, adapted to cooperate with the head of a rail, said tread comprising a circumferential series of elongated oblique overlapping bridges, with intervening elongated overlapping oblique slots; elastic inserts mounted in said slots and projecting beyond said tread to form the surface normally in rolling contact with the rail; and means for adjusting respective inserts in a radial direction, each means comprising a pair of swiveled threaded sleeves geared together, and a plunger engaging the corresponding insert and having threaded stems engaged by said sleeves.

5. A wheel for rail vehicles comprising in combination, a wheel body including an annular rim formed with a tread and a flange adapted to coact with the head of a rail, said tread comprising a circumferential series of elongated oblique overlapping bridges with intervening elongated overlapping slots which extend substantially radially through the rim, and are contracted toward their outer ends, said bridges being so dimensioned and arranged as to be capable of supporting the wheel on and entering into smooth rolling contact with a rail; elastic inserts mounted in said slots; and means for sustaining said inserts with their outer ends projecting radially beyond said tread.

6. A wheel for rail vehicles comprising in combination, a wheel body including an annular rim formed with a tread and a flange adapted to coact with the head of a rail, said tread comprising a circumferential series of elongated oblique overlapping bridges with intervening elongated overlapping slots which extend substantially radially through the rim, and are contracted toward their outer ends, said bridges being so dimensioned and arranged as to be capable of supporting the wheel on and entering into smooth rolling contact with a rail; elastic inserts mounted in said slots; and radially adjustable means for sustaining said inserts.

7. A wheel for rail vehicles comprising in combination, a wheel body including an annular rim formed with a tread and a flange adapted to coact with the head of a rail, said tread comprising a circumferential series of elongated oblique overlapping bridges with intervening elongated overlapping slots which extend substantially radially through the rim, and are contracted toward their outer ends, said bridges being so dimensioned and arranged as to be capable of supporting the wheel on and entering into smooth rolling contact with a rail; elastic inserts mounted in said slots; and a plurality of individually adjustable means each in sustaining relation with a corresponding insert.

8. A wheel for rail vehicles comprising in combination, a wheel body including an annular rim formed with a tread and a flange adapted to coact with the head of a rail, said tread comprising a circumferential series of elongated oblique overlapping bridges with intervening elongated overlapping slots which extend substantially radially through the rim, and are contracted toward their outer ends; elastic inserts mounted in said slots; a sustaining member removably attached to said wheel body within said rim; and adjustable sustaining means for said inserts, carried by said member and removable from the wheel as a unit therewith.

9. A wheel for rail vehicles comprising in combination, a wheel body including an annular rim formed with a tread and a flange adapted to coact with the head of a rail, said tread comprising a circumferential series of elongated oblique overlapping bridges with intervening elongated overlapping slots which extend substantially radially through the rim, and are contracted toward their outer ends; elastic inserts mounted in said slots; a sustaining member removably attached to said wheel body within said rim; and individually adjustable sustaining means for each insert, carried by said member and removable from the wheel as a unit therewith.

10. A wheel for rail vehicles comprising in combination, a wheel body including an annular rim formed with a tread and a flange adapted to coact with the head of a rail, said tread comprising a circumferential series of elongated oblique overlapping bridges with intervening elongated overlapping slots which extend substantially radially through the rim, and are contracted toward their outer ends; elastic inserts mounted in said slots; a sustaining member removably attached to said wheel body within said rim; and individually adjustable sustaining means for each insert, carried by said member, said means each including at least two threaded thrust means, geared together to act in unison.

11. A wheel for rail vehicles comprising in combination, a wheel body including an annular rim formed with a tread and a flange adapted to coact with the head of a rail, said tread comprising a circumferential series of elongated oblique overlapping bridges with intervening elongated overlapping slots which extend substantially radially through the rim, and are contracted toward their outer ends; elastic inserts mounted in said slots; a sustaining member attached to said wheel body within said rim; and individually adjustable sustaining means for each insert, such means each comprising a pair of threaded sleeves swiveled in said member and geared together, and a plunger contacting said insert and having threaded stems engaged by the threads of said swiveled sleeves.

12. A wheel for rail vehicles comprising in combination a wheel body having a tread and a flange, the flange being continuous and the tread being made up of a series of approximately spiral bridges with intervening spiral slots, so dimensioned and arranged that the tread is capable of entering into smooth rolling contact with a rail; and a plurality of elastic inserts, one confined in each of said slots and so dimensioned and arranged that they project slightly beyond said tread and coact to produce an elastic tread which will enter into smooth rolling contact with a rail.

13. The structure defined in claim 12, in which the slots are contracted in an outward radial direction and embrace the insert on all sides.

14. The structure defined in claim 12, in which the slots are contracted in an outward radial direction and embrace the insert on all sides, and the insert takes the form of a rubber block.

15. The structure defined in claim 12, in which the slots are contracted in an outward radial direction, and adjustable means are provided to force the inserts in such direction.

ALBERT HUGUENIN.